US 9,452,448 B2

(12) United States Patent
Dettmer et al.

(10) Patent No.: US 9,452,448 B2
(45) Date of Patent: Sep. 27, 2016

(54) SEPARATING DEVICE FOR A POTATO HARVESTER

(71) Applicant: Grimme Landmaschinenfabrik GmbH & Co. KG, Damme (DE)

(72) Inventors: Franz-Josef Dettmer, Ankum (DE); Christian Döhmann, Alfhausen (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 0 days.

(21) Appl. No.: 14/708,204

(22) Filed: May 9, 2015

(65) Prior Publication Data
US 2015/0321225 A1    Nov. 12, 2015

(30) Foreign Application Priority Data
May 10, 2014    (DE) .................. 10 2014 006 842

(51) Int. Cl.
*A01D 33/08* (2006.01)
*B07B 9/00* (2006.01)
*A01D 33/02* (2006.01)
*A01D 33/04* (2006.01)

(52) U.S. Cl.
CPC .............. *B07B 9/00* (2013.01); *A01D 33/02* (2013.01); *A01D 33/04* (2013.01); *A01D 33/08* (2013.01)

(58) Field of Classification Search
CPC ............ B07B 1/10; B07B 1/28; B07B 7/00; B07B 7/01; B07B 7/02; B07B 7/04; B07B 9/00; B07B 9/02; B07B 11/06; B07B 13/116; A01D 33/02; A01D 33/04; A01D 33/08
See application file for complete search history.

(56) References Cited

U.S. PATENT DOCUMENTS

| 3,603,063 A * | 9/1971 | Stroburg ............... A01F 12/444 460/109 |
| 5,024,278 A * | 6/1991 | Shuknecht ............. A01D 23/04 171/17 |
| 7,066,810 B2 * | 6/2006 | Farley ................ A01D 41/1243 460/112 |

(Continued)

FOREIGN PATENT DOCUMENTS

| CA | 2 880 593 A1 | 2/2014 |
| CN | 201336820 Y | 11/2009 |

(Continued)

OTHER PUBLICATIONS

Grimme Landmaschinenfabrik GmbH & Co. KG "Produktprogramm"; GEN.00283, 08/13/5000; Erntetechnik (pp. 14-23); 2013; Germany.

*Primary Examiner* — Joseph C Rodriguez
(74) *Attorney, Agent, or Firm* — Gudrun E. Huckett

(57) ABSTRACT

A separating device for separating a crop from a mixture with admixtures has a drop stage and a conveying device supplying the mixture in a conveyed stream to the drop stage. An air stream is supplied to the drop stage, wherein the mixture is falling in the drop stage and is affected by the air stream, wherein the drop stage effects loosening of the mixture. A retaining element is arranged downstream of the drop stage so as to face the mixture falling in the drop stage. The air stream interacts with the retaining element. Downstream of the retaining element the crop and solid bodies separated from the mixture are transported farther as separated individual parts in substantially opposite conveying directions. A diverting device is provided that can at least partially divert the conveyed stream upstream of the retaining element.

24 Claims, 6 Drawing Sheets

(56) References Cited

U.S. PATENT DOCUMENTS

| | | | |
|---|---|---|---|
| 7,950,989 B2* | 5/2011 | Dow | A01D 41/1243 460/112 |
| 8,167,136 B2* | 5/2012 | Betti | B26D 7/18 198/588 |
| 8,821,229 B2* | 9/2014 | Stan | A01F 12/444 460/99 |
| 2009/0057208 A1* | 3/2009 | Pellenc | A01D 46/285 209/606 |
| 2015/0201553 A1* | 7/2015 | Kalverkamp | A01D 33/04 209/472 |
| 2015/0321226 A1* | 11/2015 | Dettmer | B07B 9/00 209/29 |

FOREIGN PATENT DOCUMENTS

| | | |
|---|---|---|
| DE | 210 847 A1 | 6/1984 |
| DE | 43 38 477 A1 | 5/1995 |
| EP | 1 133 909 A2 | 9/2001 |
| EP | 2 016 819 A1 | 1/2009 |
| RU | 2286041 C2 | 10/2006 |
| SU | 1042648 A1 | 9/1983 |

\* cited by examiner

SEPARATING DEVICE FOR A POTATO HARVESTER

BACKGROUND OF THE INVENTION

The invention concerns a potato harvesting machine or a processing machine which is provided with a separating device for removing clods, rocks, haulm and the like entrained admixtures from the picked-up crop-containing mixture. A conveying device supplies the substantially compact mixture as a conveyed stream, from where the mixture, moved into the area of a drop stage and, in the process, being affected by means of a conveying medium in the form of an air stream, can be separated, wherein, downstream of the drop stage that is effecting loosening of the mixture, at least one retaining element is provided that is oriented so as to face the falling mixture and is interacting with the at least one air stream in such a way that at least the crop and the solid bodies can be separately conveyed, away from the retaining device, as sorted individual parts in substantially oppositely oriented conveying directions, respectively.

Different method variants are known for machines and devices for root crop treating and processing, in particular potato harvesting machines. In particular for separation of potatoes and similar crop from a picked-up soil mixture with clods, rocks, similar solid bodies as well as fibrous admixtures, different concepts of mechanical separating devices with belts and screens are used (company brochure Grimme Landmaschinenfabrik GmbH & Co. KG, Damme; "Produktprogramm" (translation: product line); GEN.00283, Aug. 13, 5000; Erntetechnik (translation: harvesting technology); pp 14 to 23).

In a solution according to CA 2 880 593 A1 for affecting the mixture that has been picked up by a potato harvesting machine, an air stream is additionally utilized which is acting in the area of a retaining element onto the goods to be separated that are moved by a conveyor across a drop stage. This air stream is directed onto the mixture that is present in loosened form in the area of the retaining element so that, in the area of a fluidic separating bed, assistance is provided for a further activated transport of crop and solid bodies in oppositely extending conveying directions.

EP 1 133 909 A2 discloses a root crop harvesting machine that comprises a system with several belt conveyors. The latter can be pivoted into variable active positions. A fluidic separation is not provided in any of the conveying areas.

A conveying device for beets according to DE 43 38 477 A1 comprises rod conveyor belts operating as steep conveying devices so that, in combination with flat conveyors, the cleaning process is improved. A fluidic separation is not provided in this device.

The invention has the object to design a potato harvesting machine provided with a fluidic separating device in such a way that with minimal technical expenditure the operation of the machine can be retrofitted in accordance with changing harvesting conditions and, in this way, an optimal mixture separation is enabled at reduced energy expenditure.

SUMMARY OF THE INVENTION

The invention solves this object with a separating device of a potato harvesting machine or processing machine of the aforementioned kind in that the at least one supplied conveyed stream can be at least partially diverted in the area upstream of the retaining element. Further advantageous embodiments can be taken from the dependent claims.

For improving the potato harvesting machine that is cooperating with a fluidic separating device according to CA 2 880 593 A1, in particular a reduction of the energy expenditure required for the total system is provided by the invention in conjunction with a separating quality that is maintained at least at the same level. For this purpose, in particular a selective activation or deactivation of separating and cleaning components of the machine is to be employed. Based on this, the system with the integrated separating device according to the invention is now improved such that this machine is provided with the option that the conveyed stream of the mixture can bypass the active area of the separating device. In this diverting phase, it is then, at least temporarily, also possible to operate at reduced output or to switch off the air stream or appropriate auxiliary components of the separating device.

In regard to the overall complex conveyed stream of the mixture in the machine, it is provided that the at least one supplied conveyed stream is at least partially divertable in the area upstream of the retaining element.

In this context, the conveyed stream that is supplied by the generally known conveying device is guided such that it can then be discharged, in particular without contact with the retaining element of the separating device, directly into a downstream and/or adjacently positioned conveying zone. This concept of diverting the conveyed stream is preferably geared to using a constructively variable mechanism of action in the area of a terminal element of the conveying device. Also conceivable is that the provided diverting action of the conveyed stream is connected immediately in the area of the conveying device or that an active component group is installed at its input elements.

The constructively optimal realization of this mixture guiding action according to the invention provides that in the area of the retaining element a diverting component group is arranged that acts at least as a bypass. This diverting component group can be positioned in widely variable positions of use in such a way that dividing of the conveyed stream by means of the diverting component group is also possible. The structure of the diverting component group is to be adjusted in this context to flexible conveying conditions wherein the diverting component group advantageously may also be comprised of several guiding elements. These guiding elements themselves can be movable and/or slidable individually so that variable diverting directions in different diverting zones or bypass structures are possible.

For an optimal utilization of the machine in the area of the integrated separating device, it is possible that at least one of the guiding elements or the entire diverting component group is embodied as a construction that can be operated by hand. Accordingly, the machine can be furnished prior to a respective use or the system is retrofitted during a processing break.

The expedient configuration of the diverting component group provides that it is formed as a bridge that at least partially bridges the retaining element. This variable construction that is variable with regard to its bridging length can also be extended in further embodiments into the effective range of the conveying device that is supplying the mixture.

In the simplest embodiment, it is provided that the bridge that is provided with a slide plate forming a transport slant is movable by hand into the position of use. In this way, a "passive" bridge is integrated into the system in which the slide plate is effective as a variably usable guiding element. This passive bridge can be provided preferably with a screen structure in the area of the slide plate that forms the transport slant so that in this way an additional cleaning function can be exerted on the mixture. Also, it is conceivable that the slide plate is designed to be adjustable to different transport slants. By means of this adjustment, the mixture discharge upon transfer from the conveying stretch can be affected.

The bridge forms a component group that can be additionally integrated into the machine concept. It can be provided as a pre-assembled unit and, due to its constructive configuration, inserting or pivoting into the position of use can be realized.

Based on the afore described embodiments of the diverting component group in the form of the guiding elements and the "passive" bridge, it is provided that these component groups can also be provided with a controllable drive, respectively, for improved control and governing operations. These component groups as a whole or the functional individual parts can be adjusted by means of electrical or hydraulic drive members and their variable control units to different harvesting conditions.

A first embodiment of this "driven" diverting component group provides that it is embodied in the form of a conveying unit that comprises a motoric rotary drive. In this context, a screen belt can be used as a conveying unit, for example. For optimal positioning in the also variable position of use, it can be provided with a pivotable and/or slidable support connection in the frame of the machine. Accordingly, this conveying unit can remain as a permanent component within the machine and the demand-oriented activation or deactivation of this diverting system is possible with minimal expenditure.

Based on the conveying unit comprising the screen belt being arranged substantially above the retaining element of the separating device, it is conceivable that this conveying unit can be moved from its diverting position of use also into additional utilization positions within the machine. Accordingly, the cleaning process of the mixture occurring within the machine can be further improved and the "double function" of this screen belt can be effectively realized.

An advantageous embodiment of the system provides that the diverting component group or the conveying unit provided therefor can be pivoted or pushed at least sectionwise into a position of use interacting with the air stream of the separating device. Based on the available space within the machine, different pivoting zones can thus be bridged so that corresponding functional effects and additional discharge functions can be fulfilled.

In particular, it is provided that the conveying unit provided with the screen belt is movable into the area of a discharge belt provided downstream of the retaining element. This movement can be realized in different positions of use such that separated goods or mixture components, moved by a blowing movement action out of the area of the activated separating device, are collected by the optimally positioned screen belt, transported farther within the machine, and directly discharged therefrom.

A further constructive configuration for diverting the conveyed stream in the area of the retaining element provides that now in the area of the conveying device that supplies the mixture at least one transfer device is provided that can be changed with regard to its transport length. This transfer device is located in particular at the end of a deflecting zone that conveys the mixture upwardly and is arranged immediately in front of the fluidic separating bed with the retaining element. In this context, it is in principle conceivable to introduce a partial stream of the air stream also into the area of the transfer device.

The optimal embodiment of the transfer device provides that it is designed as a screen belt that, by means of an in particular spring-elastic component group, can be moved into different positions of use. Preferably, the screen belt is provided with an adjusting spring that exerts a permanent tensioning force onto the screen belt and engages the return run of the screen belt by means of a roller deflection.

The support of the screen belt in the area of the changeable transport length is realized by means of two deflection rollers, wherein one is stationarily supported and the other can be moved by means of a lifting cylinder against the force of the adjusting spring such that the working run of the screen belt is extended. The drive action is introduced by the stationary lifting cylinder whose piston rod engages the displaceable deflection roller.

With the afore described concept of the changeable transport length, a transfer device is provided that is movable into an extended position that bridges the retaining element and moves the stream of goods into the area of the discharge belt. Accordingly, a "bridge construction" with changeable active plane is provided and the system as a whole can be variably adjusted to changing streams of goods.

BRIEF DESCRIPTION OF THE DRAWINGS

Further details and advantageous embodiments of the invention result from the following description and the drawing in which two embodiments of the device according to the invention with diverting component group are illustrated.

DESCRIPTION OF PREFERRED EMBODIMENTS

Figure 1:
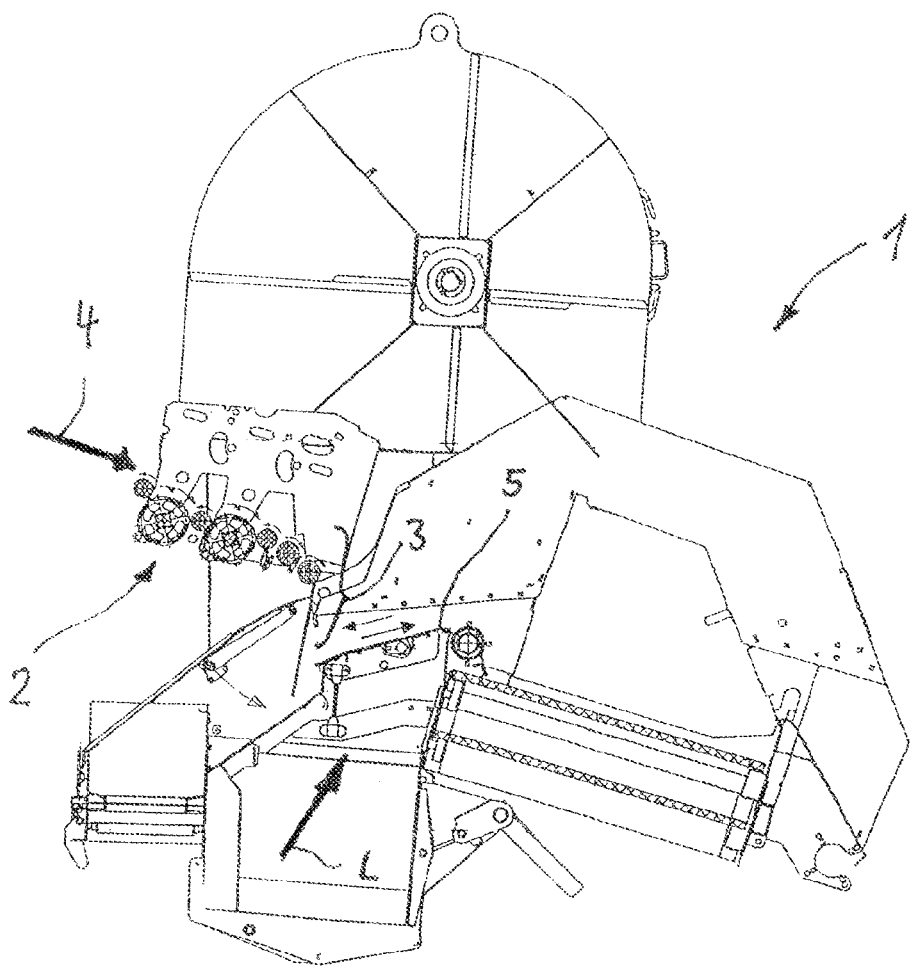
FIG. 1 shows a side view of a separating device for a potato harvesting machine according to the prior art.
Figure 2:
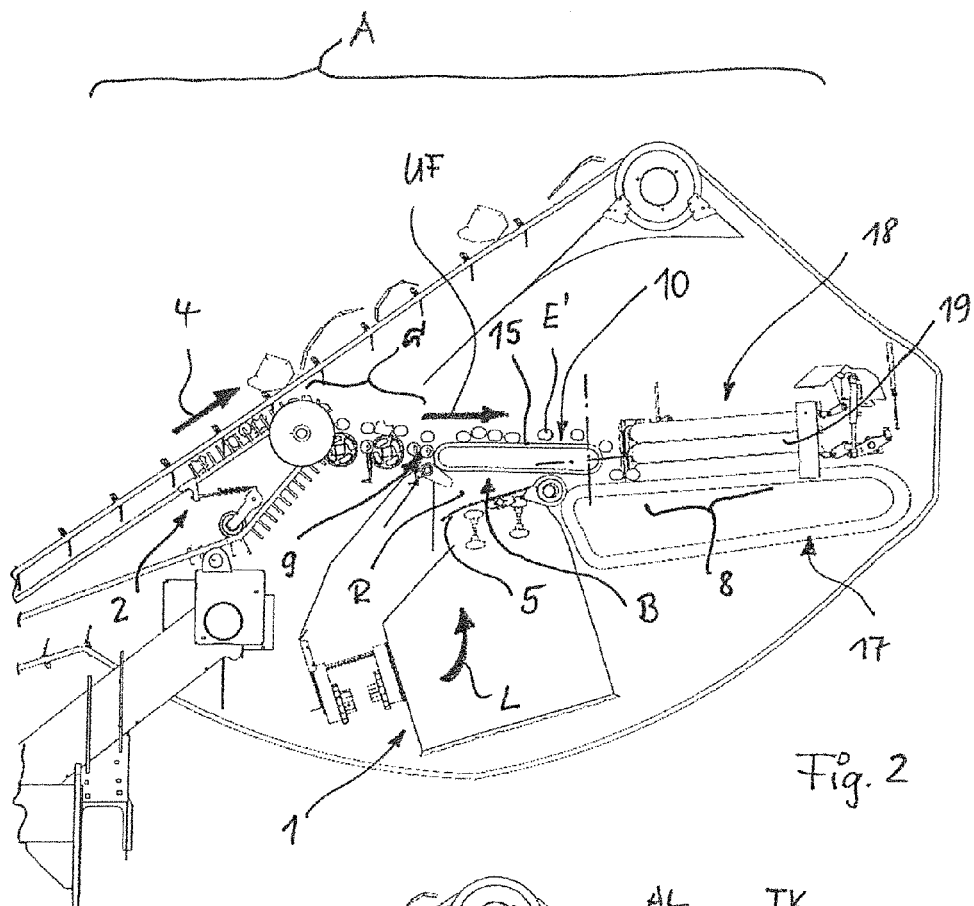
FIG. 2 shows a partially sectioned side view with a separating device integrated into the potato harvesting machine and a first embodiment of a diverting component group in the area of the retaining element.
Figure 5:
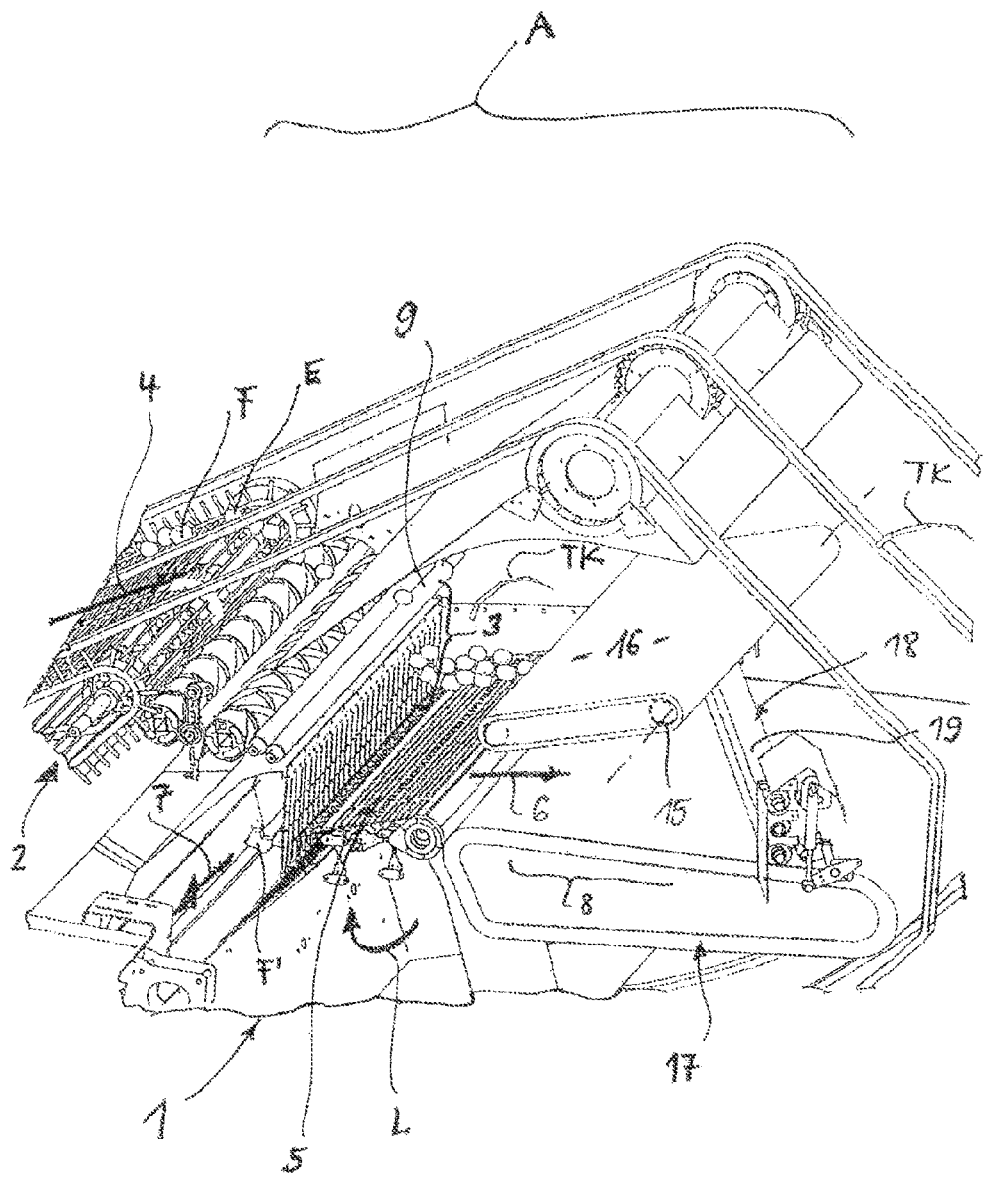
FIG. 5 is a perspective illustration similar to FIG. 4.

In FIG. 1, a separating device that is known from the prior art and identified as a whole by 1 is illustrated which, according to the illustration in FIG. 2, is integrated into a potato harvesting machine A. Such a separating device 1 is provided for separating potatoes or similar crop E from a mixture G with admixtures such as clods, rocks, and similar solid bodies F. In such systems , the mixture G is supplied as a conveyed stream 4 by means of a conveying device that is referenced as a whole by 2 from a pickup area of the machine A, not illustrated in detail. Following this conveying stretch, the mixture G reaches the area of a drop stage 3 (FIG. 1) from where the mixture G that becomes more and more loose is moved onto a retaining element 5 in the area of the separating device. In this area, the actual "sorting" of the important components of the mixture G takes place, wherein the crop E' and the solid bodies F' are conveyed further separately in a respective substantially oppositely extending conveying direction (arrows 6, 7; FIG. 5). An air stream L generated by means of an external blower (not illustrated) provides assistance in this separating phase so that a significant improvement of the separating process can be achieved by additional energy introduction.

The concept according to the invention of a variably usable separating device 1 is now based on the premise that the cleaning action of the separating device 1 on a machine A is not required in all individual situations. This can be the case, for example, when a mixture stream G that is substantially free of hard solid bodies, in particular due to the lack of rocks or clods, is to be handled within the system.

In this application situation, the construction according to the invention provides in particular that the at least one supplied conveyed stream 4 is diverted at least partially in the area upstream of the retaining element 5. A goal of this diverting action can be in this context that the conveyed stream 4 is moved by means of the conveying device 2 in the usual way within the machine A and can also be discharged directly into a downstream and/or adjacently positioned conveying zone 8 (FIG. 4) without contact with the retaining element 5 along the conveying stretch.

From the general sequence of movements of the mixture G in FIG. 2, it is apparent that the diverting action of the conveyed stream 4, illustrated by arrow UF, is in particular effective from the area of a terminal element 9 of the conveying device 2 onward. The constructive realization of this system provides that a diverting component group 10 designed as a bypass is effective in the area of the retaining element 5. In this way, a conceivable configuration of the bypass structure integrated as an auxiliary construction into the machine concept A is shown.

The constructive realization of this diverting component group 10 provides that for the latter a positioning in variable positions of use is possible such that for different conveying concepts a respective optimal active position is predetermined. In this context, it can be provided in particular that a division of the conveyed stream 4 is realized and in this context, for example, in deviation from the diverting direction UF, the movement into a respective transverse direction can also be realized (not illustrated, respectively).

Based on the diverting function in the area of the separating device 1, a configuration of the diverting component group 10 with several guiding elements (not illustrated) is conceivable also. These guiding elements can be designed as individually positionable parts, respectively. It is also conceivable that at least one of the guiding elements of the diverting component group 10 can be moved by hand.

Figure 3:
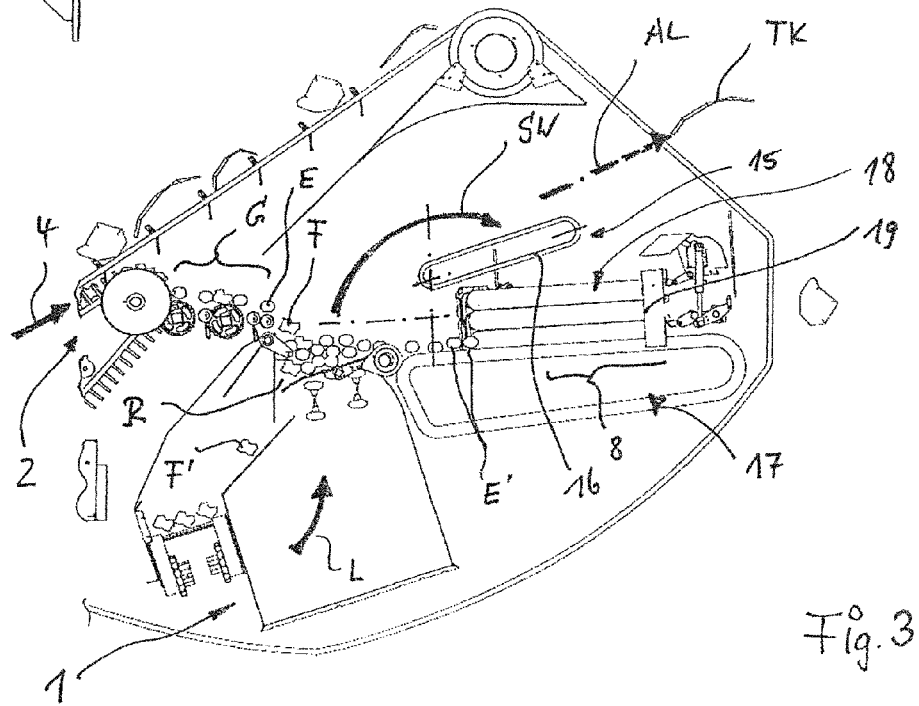
FIG. 3 is a side view similar to FIG. 2 with the diverting component group in a changed utilization position.

Based on the illustrations according to FIG. 2 to FIG. 6, it is apparent that the variable concept of the diverting component group 10 for the area above the retaining element 5 leads to a configuration like a bridge B or B' (FIG. 6) extending across the shaker space R (FIG. 2, FIG. 3). This bridge construction is in particular geared to keeping the stream of goods G away by a diverting function (arrow UF) only from the area of the movable retaining element 5. Based on this, the already discussed option of decoupling of the air stream L or the sorting function of the entire separating device 1 from the drive concept of the machine A is realized so that by this "shutdown" working with reduced drive energy is possible at least phase-wise and an energy-saving mode can be utilized in this way.

Figure 6:
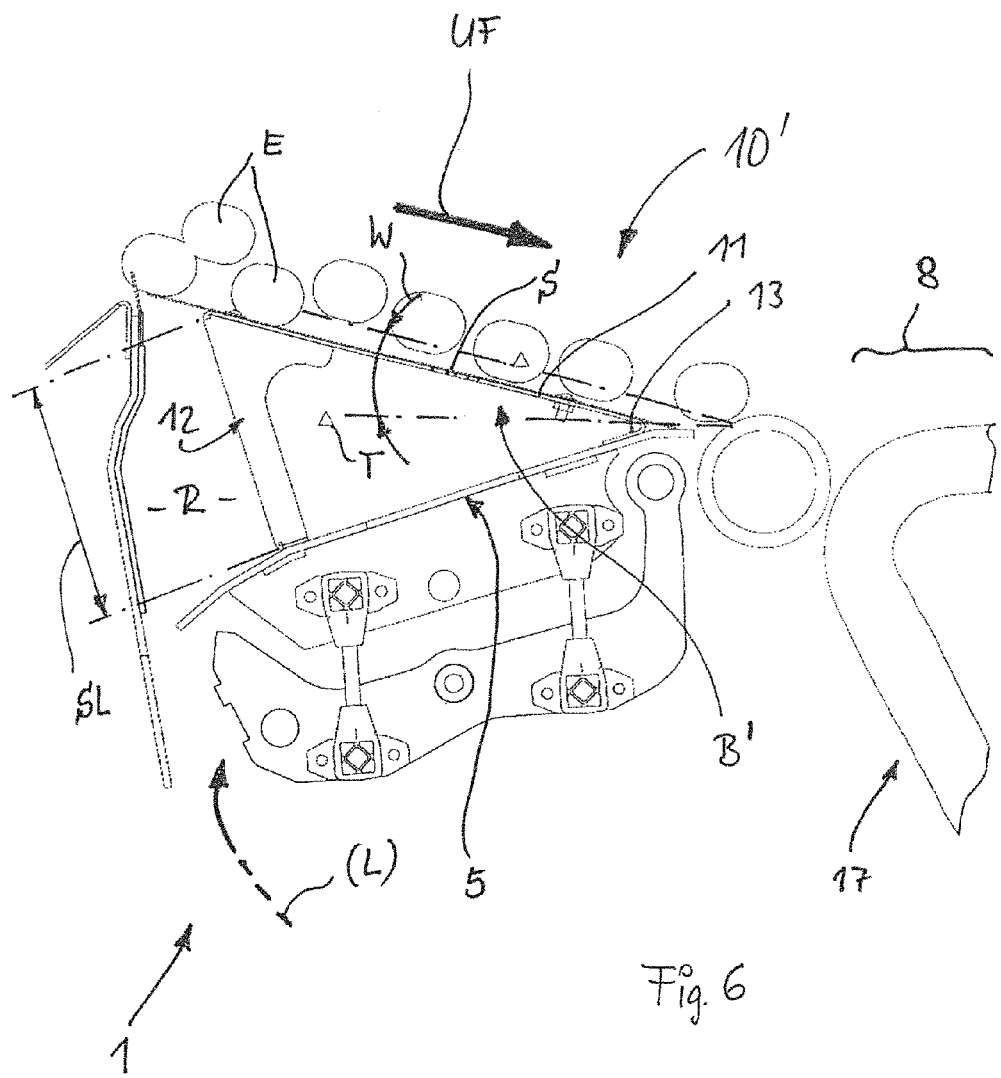
FIG. 6 is an enlarged detail illustration of the system in the area of the separating device with a second embodiment of the diverting component group.

In the second embodiment of the system according to FIG. 6, the bridge B' is designed in the form of a "passive" element. This bridge B' in this context is provided with at least one slide plate 11 forming a transport slant (angle W). This bridge B' that is to be positioned in particular by hand in the illustrated position of use comprises in the area of the slide plate 11 that forms the transport slant W a special screen structure S so that parts T of the separated goods (admixtures) passing through this slide plate 11 are discharged into the lower part of the machine under the effect of gravity.

In the illustrated embodiment, the bridge B is provided with a support leg 12 that determines the slant angle W and that comprises in particular a length SL that corresponds to the height of the drop stage 3 (FIG. 1). For a stationary support on the retaining element 5, a support contour 13 is provided opposite the leg 12 so that the bridge B' as a whole has a stable mounted position. This bridge B' is in particular designed as an autarkic preassembled unit which optionally can be placed or pushed into the position of use onto the retaining element 5. By appropriate connectors, the bridge B' can also be secured with form fit on the retaining element 5. Also, it is conceivable to secure the bridge B' on a pivot construction (not illustrated) so that, when sufficient free space within the machine A is available, a displacement from the position of use is possible and a permanent installation of the bridge B' is conceivable.

Based on the afore described diverting component group 10, 10' in the form of the "passive" bridge B' or the generally described guiding elements, a constructive expansion of this concept is provided also. In particular, a further improvement can be achieved in that the diverting component group 10, 10' in all of its embodiments can also be provided with at least one controllable drive unit.

Figure 4:
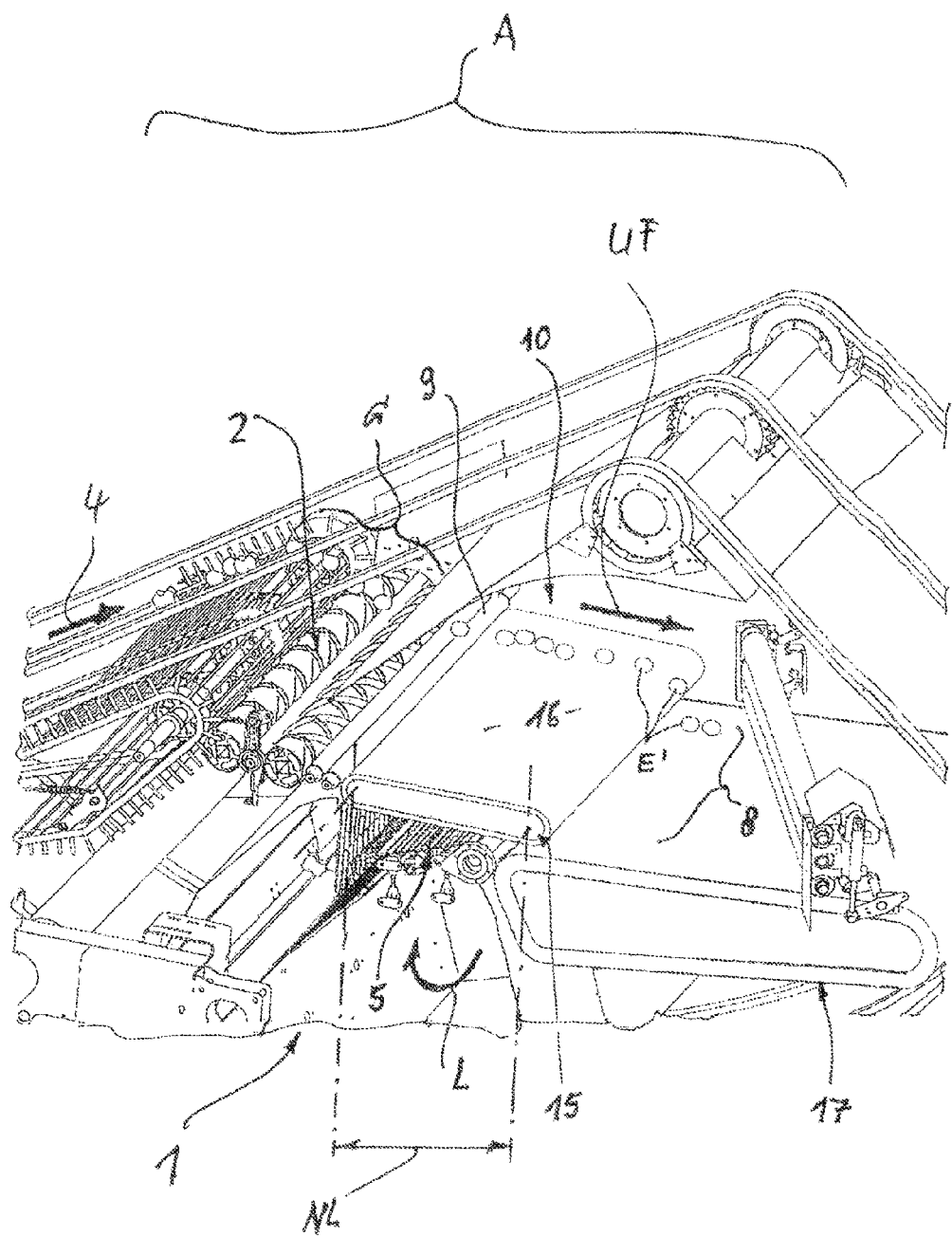
FIG. 4 is a perspective illustration of the system similar to FIG. 2.

From the illustrations according to FIG. 2 to FIG. 5, the configuration of a conveying unit 15 provided with a drive is apparent in a principal illustration. This actively driven conveying unit 15 assumes a position of use that corresponds to that of the "passive" bridge B' according to FIG. 6 above the retaining element 5 (FIG. 4). It is conceivable in this context that by an appropriate configuration of the conveying unit 15 also an extended utilization length NL (FIG. 4) can be employed which, for example, extends into the area of the conveying unit 2.

For positioning this conveying unit 15 in the respective position of use, different displacement possibilities are conceivable. In this context, the conveying unit 15 for positioning in its position of use can comprise a pivotable and/or slidable support connection within the machine A.

In an expedient embodiment, the conveying unit 15 which is embodied as a screen belt 16 (FIG. 4) is designed as a pivotable component group so that, by an appropriate movement (angle SW, see FIG. 3; compare FIG. 4 and FIG. 5), the retaining element 5 can be exposed for its "normal function". The movement can also be carried out in this context by means of a control unit (not illustrated) as a push movement or a pivoting/lifting movement.

Based on this pivot movement SW, the concept provides that the pivoted screen belt 16 in the reached position of non-use according to FIG. 5 can define an additional utilization position within the machine A. This results from the fact that the respective diverting component group 10 as a whole, or at least the afore described screen belt 16, at least sectionwise can be brought into a position interacting with the air stream L of the separating device 1. In this context, it is apparent that separated goods (admixtures) TK moved by a partial air stream AL reach the area of the screen belt 16 and here assistance in discharging the separated goods (admixtures) TK can be provided In the illustrations according to FIGS. 3 and 5, said installed position pivoted about the angle SW is illustrated wherein the screen belt 16 is arranged above a guiding system 18 integrated into the machine A and, with said system, the separated goods TK can be moved into a rearward discharge position.

In this context, the conveying unit 15, provided with a screen belt 16 that is embodied in particular as a haulm removal belt, is positioned such that it extends into the area of a discharge belt 17 provided downstream of the retaining element 5 and in this way separated goods TK moved by a blowing movement action can be additionally discharged by means of the screen belt 16. In particular, it is provided that the screen belt 16 assists in the separating and cleaning process in the area of a roller stripper 19 provided for clod separation and potato diverting action.

Figure 7:
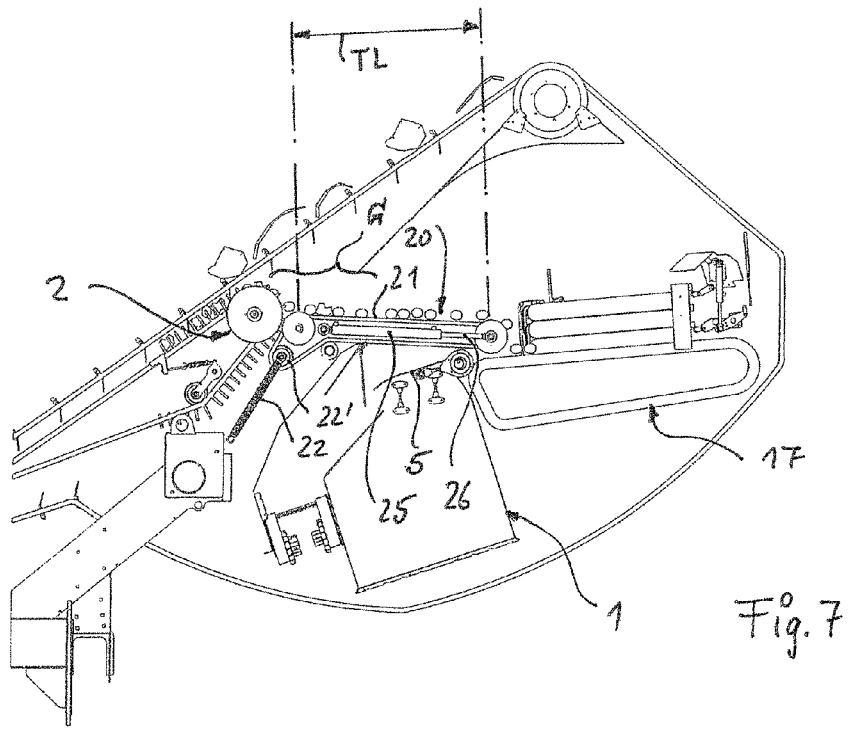
FIG. 7 is a side view similar to FIG. 2 with a transfer device provided in the area of the conveying device in extended position of use.
Figure 8:
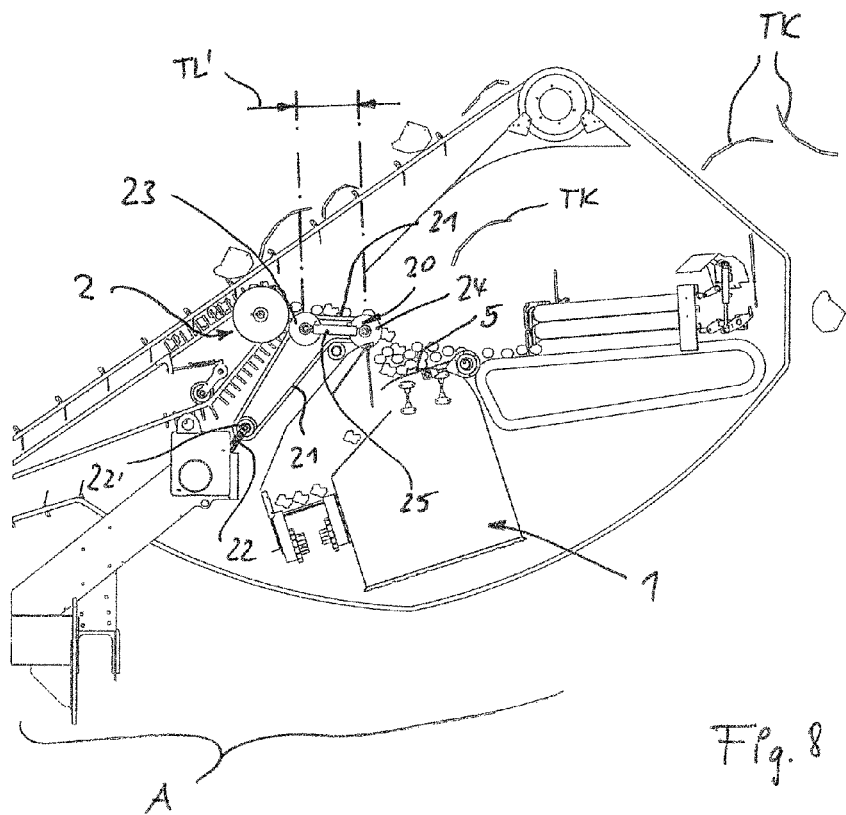
FIG. 8 is a side view similar to FIG. 7 with the transfer device in a position of use with shortened length.

Based on the construction of the potato harvesting machine A shown in FIG. 1 and FIG. 2 together with the conveying device 2 illustrated therein for movement of the mixture G, a variant of the diverting action of the conveyed stream 4 by means of a transfer device 20 is illustrated in FIG. 7 and FIG. 8. This transfer device 20 is arranged immediately downstream of the upward conveying phase of the mixture G at the end of the conveying device 2 in such a way that the active stretches illustrated as different transport lengths TL and TL' can be adjusted here.

In this context, the transfer device 20 is preferably designed as a screen belt 21. The latter is secured by means of an adjusting spring 22, engaging the return run of the screen belt 21 as a counter holder, in a "pretensioned" position (FIG. 8). In this area, the circulating screen belt 21 is guided across a roller 22'.

In the area of an active stretch which forms the transport lengths TL. TL', the screen belt 21 has two deflection rollers 23 and 24 where, by means of an adjusting member embodied in particular as a lifting cylinder 25, a length change is possible, i.e., the spacing between the deflection rollers 23, 24 can be changed. It is apparent from the extended position TL according to FIG. 7 that the lifting cylinder 25 in proximity to the connection to the conveying device 2 is stationarily supported. The leading end of the piston rod 26 engages in this context the second one of the deflection rollers 24 in such a way that the latter can be moved in particular in a straight line.

In the illustrated extended position of the piston rod 26, the upper run of the screen belt 21 has been moved into a position of use bridging the retaining element 5 and extending into the area of the discharge belt 17. In this displacement by means of the hydraulic cylinder 25, a constant tension of the screen belt 21 is maintained at the same time in that the adjusting spring 22 produces the appropriate length compensation. Upon return movement of the piston rod 26, the spring 22 is also returned into the initial position illustrated in FIG. 8 and the separating function of the retaining element 5 in the area of the device 1 is activatable.

The specification incorporates by reference the entire disclosure of German priority document 10 2014 006 842.0 having a filing date of May 10, 2014.

While specific embodiments of the invention have been shown and described in detail to illustrate the inventive principles, it will be understood that the invention may be embodied otherwise without departing from such principles.

What is claimed is:

1. A separating device for a potato harvesting machine or a processing machine for separating a crop from a mixture of the corp with admixtures, the separating device comprising:

a drop stage;

a conveying device supplying the mixture in at least one conveyed stream to the drop stage;

a conveying medium in the form of an air stream supplied to the drop stage, wherein the mixture is falling in the drop stage and is affected by the air stream, wherein the drop stage effects loosening of the mixture;

a retaining element arranged downstream of the drop stage so as to face the mixture falling in the drop stage;

wherein the air stream interacts with the retaining element;

wherein downstream of the retaining element the crop and solid bodies separated from the mixture are transported farther as separated individual parts in a first conveying direction and a second conveying direction, respectively;

diverting means configured to completely divert, when activated, the at least one conveyed stream upstream of the retaining element and to discharge the at least one conveyed stream supplied by the conveying device directly into a downstream and/or adjacently positioned conveying zone without contacting the retaining element, wherein the retaining element and the air stream are configured to operate at reduced output or be switched off at least temporarily when the diverting means is activated.

2. The separating device according to claim 1, wherein the diverting means is positioned in an area of a terminal element of the conveying device.

3. The separating device according to claim 1, wherein the diverting means is a diverting component group acting as a bypass at least in the area of the retaining element.

4. The separating device according to claim 3, wherein the diverting component group is configured to be positioned in variable positions of use such that a division of the at least one conveyed stream is realized.

5. The separating device according to claim 3, wherein the diverting component group is comprised of several guiding elements.

6. The separating device according to claim 5, wherein the guiding elements are individually positionable.

7. The separating device according to claim 5, wherein at least one of the guiding elements is moveable by hand.

8. The separating device according to claim 3, wherein the diverting component group is a bridge that at least partially bridges the retaining element.

9. The separating device according to claim 8, wherein the bridge comprises a slide plate forming a transport slant and is moveable by hand into a position of use.

10. The separating device according to claim 9, wherein the bridge in the area of the slide plate forming the transport slant is provided with a screen structure.

11. The separating device according to claim 9, wherein the transport slant is adjustable.

12. The separating device according to claim 8, wherein the bridge is a preassembled unit and is configured to be inserted or pivoted into a position of use.

13. The separating device according to claim 3, wherein the diverting component group comprises components that are displaceable by means of at least one controllable drive unit, respectively.

14. The separating device according to claim 3, wherein the diverting component group is a conveying unit comprising a drive.

15. The separating device according to claim 14, wherein the conveying unit comprises a pivotable and/or slidable support connection configured to position the conveying unit in a position of use.

16. The separating device according to claim 14, wherein the conveying unit comprises a screen belt and is configured to be moved from a diverting position of use into an additional utilization position.

17. The separating device according to claim 3, wherein the diverting component group at least sectionwise is pivotable and/or slidable into a position of use in which the diverting component group interacts with the air stream.

18. The separating device according to claim 17, further comprising a discharge belt downstream of the retaining element, wherein the diverting component group is a conveying unit comprising a drive, wherein the conveying unit comprises a screen belt and is arranged in the area of the discharge belt such that, above the discharge belt, admixtures separated from the mixture and moved by a blowing movement action are discharged by the screen belt.

19. A separating device for a potato harvesting machine or a processing machine for separating a crop from a mixture of the corp with admixtures, the separating device comprising:
- a drop stage;
- a conveying device supplying the mixture in at least one conveyed stream to the drop stage;
- a conveying medium in the form of an air stream supplied to the drop stage, wherein the mixture is falling in the drop stage and is affected by the air stream, wherein the drop stage effects loosening of the mixture;
- a retaining element arranged downstream of the drop stage so as to face the mixture falling in the drop stage;
- wherein the air stream interacts with the retaining element;
- wherein downstream of the retaining element the crop and solid bodies separated from the mixture are transported farther as separated individual parts in a first conveying direction and a second conveying direction, respectively;
- diverting means configured to at least partially divert the at least one conveyed stream upstream of the retaining element;
- wherein the diverting means comprises at least one transfer device changeable with regard to a transport length, wherein the conveying device supplying the mixture interacts with the at least one transfer device.

20. The separating device according to claim 19, wherein the at least one transfer device is a screen belt.

21. The separating device according to claim 20, wherein the screen belt is secured by an adjusting spring.

22. The separating device according to claim 21, wherein the screen belt comprises a first deflection roller and a second deflection roller and predetermines the transport length by a spacing between the first and second deflection rollers, wherein the spacing is changeable by a lifting cylinder.

23. The separating device according to claim 22, wherein the lifting cylinder, in the area of the conveying device, is stationarily supported on the first deflection roller and a leading end of a piston rod of the lifting cylinder engages the second deflection roller that is configured to be displaceable relative to the first deflection roller by the lifting cylinder.

24. The separating device according to claim 19, further comprising a discharge belt downstream of the retaining element, wherein the transfer device is configured to be moved into an extended position bridging the retaining element so that the conveyed stream is moved toward the discharge belt.

* * * * *